United States Patent [19]

Hansen et al.

[11] 3,845,781

[45] Nov. 5, 1974

[54] CHECK VALVE FOR PULSATING FLOWS

[75] Inventors: Charles C. Hansen, Hinsdale; John D. Nilles, Roselle, both of Ill.

[73] Assignee: Refrigerating Specialties Co., Broadview, Ill.

[22] Filed: Mar. 22, 1972

[21] Appl. No.: 236,932

[52] U.S. Cl............. 137/331, 137/533.25, 137/542
[51] Int. Cl........................ F16k 29/00, F16k 15/06
[58] Field of Search.................. 137/243, 330–333, 137/540, 542, 543, 543.13, 543.23, 533.25, DIG. 3

[56] References Cited
UNITED STATES PATENTS
1,380,586   6/1921   Pelletier............................ 137/331
1,380,737   6/1921   Pelletier............................ 137/331
1,710,214   4/1929   Hassold............................ 137/331
2,301,276   11/1942   Gussick....................... 137/533.25 X
3,359,960   12/1967   Pittsley........................... 137/480 X Primary Examiner—Henry T. Klinksiek
Assistant Examiner—Richard Gerard
Attorney, Agent, or Firm—Watson D. Harbaugh; Bruce K. Thomas

[57] ABSTRACT

A back flow check valve assembly that is subjected to a pulsating flow of compressed fluid when open is constructed to compound lineal inertia with a rotational inertia at low friction with ball bearings in curvilinear raceways to lower its natural response frequency below that of the pulsating flow. The effect of the pulsations on the valve is further dampened by minimized turbulence and a fullness of the valve opening against a comparatively light closing spring which with the weight and construction of the valve closes the valve securely during idle time.

17 Claims, 4 Drawing Figures

PATENTED NOV 5 1974 3,845,781

CHECK VALVE FOR PULSATING FLOWS

BACKGROUND OF THE INVENTION

Back flow check valves have been used in the refrigeration art to prevent back flow of liquid or vapor to a positive displacement refrigerant compressor. Where there are dangers of pulsation in the exhaust manifold damaging the valve, a spring has been used to urge the valve against full opening. If the spring is sufficiently strong to prevent hammering then its strength is a burden on the compressor resulting from a substantial pressure drop being established across the check valve. High tension springs also can augment harmonic oscillations in a spring-weight system.

Also of importance is the closure and the friction factors involved with valve movement. A closely fit valve to prevent leakage requires close guide clearances and close tolerances for effectiveness. The greater the friction that may be involved, the stronger the spring required to assure a closing of the valve. The spring in turn is unfavorable to compressor performance because of the spring induced pressure drop in the valve.

Although the weight of the lineal moving valve member in the conventional check valves can be a dampening factor because of lineal inertia and gravity closing when vertically oriented, the lineal inertial factor required to avoid possible destructive harmonic vibration is so high that resulting massiveness itself is an objectionable factor both from the viewpoints of production and closing accuracy. Here again compounding weight and spring effects is related to undesirable pressure drop at the valve. In fact, it is doubtful that sufficient massiveness can be provided for lineal movement to avoid harmonic reaction with different compressor pulsations experienced without substantial costs in materials including heavier metals.

Although valves with a spiral movement that is substantially flat are known, friction has been relied upon as a snubbing action for dampening any vibration that may occur when the valve is almost closed which arises due to axial looseness of intermeshed heavy thread segments. Also, such threaded relationships require additional manual force to close the valve to overcome thread friction and likewise to initiate opening to overcome the friction between axially engaging side walls of mating Acme threads. Any pulsation dampening that may be present is due to glancing axial blows between meshed threads and additional weights and friction must be relied upon to cushion closing shocks.

SUMMARY OF INVENTION

In the present invention from an inertia viewpoint a comparatively light valve member of conventional size is provided with compounded inertias, a frictionless mounting and a light closing spring. These compositely provide an inherent harmonic frequency disassociation among the parts and place the overall harmonic responsiveness of the valve system below the pulse harmonics of conventional compressor exhausts. Such also enables space saving use of a small size valve part and port for production and accuracy of closing with a light spring which in turn permits a full opening flow which minimizes restrictiveness and flow turbulence.

The compounded inertias are related to a flywheel action superposed on lineal movement with a rolling contact mounting and results in a spiral movement which provides a comparatively wider valve opening for freer flow at all times when open and dampens pulsations without being damaged thereby.

Moreover, the inertia factor developed by the invention for dampening pulsations remains high and substantially constant regardless of flow volume and permits the force of the closing spring to be low enough initially for easy opening to such an extent that its full compression under full flow would not increase pressure drop across the valve significantly.

IN THE DRAWINGS

THE PREFERRED EMBODIMENT

Figure 1:
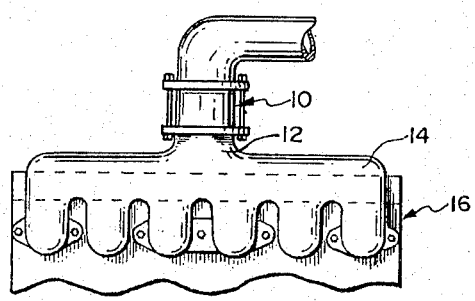
FIG. 1 is a diagrammatic showing of a multi-cylinder compressor with the device embodying the invention shown connected in the outlet of the compression manifold.

Referring to FIG. 1 a valve 10 embodying the invention is illustrated as connected by a conventional bolted joint arrangement at the outlet 12 of a compression manifold 14 of a multi-cylinder piston-displacement compressor 16 which produces a continuous flow of compressed fluid having periodic pulses.

Figure 2:
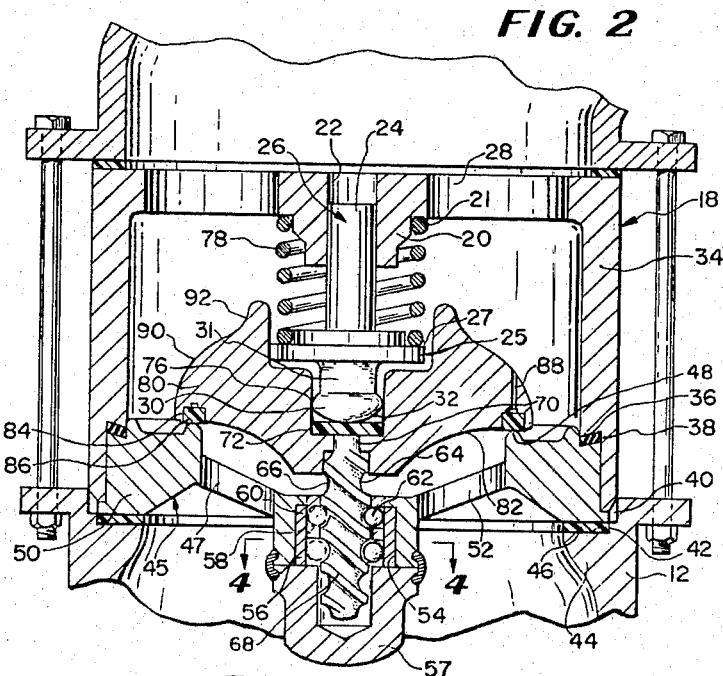
FIG. 2 is a vertical sectional view through the back flow check valve embodiment illustrated in its closed position.
Figure 3:
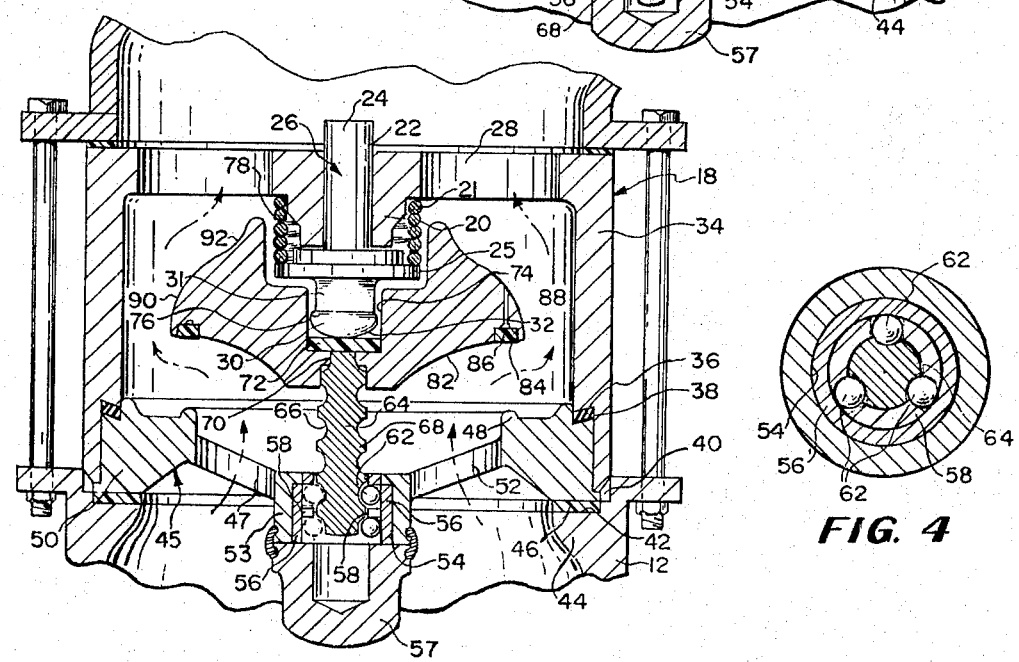
FIG. 3 is a sectional view like FIG. 2 showing the embodiment in its open position.
Figure 4:
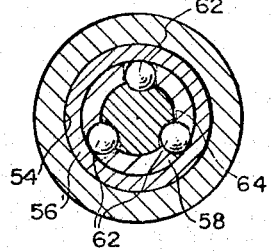
FIG. 4 is a section taken on line 4—4 in FIG. 2.

The compressor check valve 10 embodying the invention as shown in FIGS. 2 and 3 comprises a valve body 18 defining a cylindrical inverted cup-shaped housing having axial flow openings 28 circumferentially spaced around a central hub portion 20 that has a spring seat 21 and a central bore 22 that telescopically receives a shank portion 24 of a guide stem 26 upwardly therethrough in reciprocable guided relationship. A radial flange 25 on the guide stem above its head 30 has a spring seat 27 on it opposing the spring seat 21. The head 30 on the lower end of the stem 26 is rounded at 32 on the lower end as supported by a reduced neck portion 31.

The outer cylindrical wall 34 serves as a valve chamber and has a downwardly facing internal shoulder 36 receiving a sealing gasket 38 thereagainst and is provided with an externally tapered terminal edge portion to be received in guided relation around the upper face 42 of an internal flange 44 carrying a sealing gasket 46, which gaskets 38 and 46 are made of a plastic material.

The lower opening of the housing is closed by a seat plate 45 defining a spider 47 with inflow openings 52 and having a rim 50 clamped in sealed relation between the two gaskets 38 and 46. A circular land 48 around the openings 52 collectively, serves as a valve seat which upon its crown is lapped flat to within two light bands.

The hub 53 of the spider 47 has a downwardly opening cylindrical recess 54 receiving a ball bearing bushing 56 and a ball bearing cage member 58 carried by an end cap 57. The cage has six radial openings 60 therein receiving ball bearings 62. The holes and ball bearings are preferably arranged in vertical pairs that are circumferentially equi-spaced from each other such as 120° for three sets as illustrated. They receive in journalled relation a seat stem 64. Although cooperating curvilinear races may be provided which vary in their lead at particular localized positions of the valve for purposes of the invention, they are illustrated herein as comprising three concentric helical ball bearing races 66 with spiral lands 68 between them. The ball bearings 62 of each pair are spaced vertically a distance to receive one of the lands 68 between them and the respective races 66 receive the ball bearing in a rolling engagement in which the ball bearings in each pair are disposed in adjacent races. This arrangement provides two vertically spaced support points for alignment and two three-point transverse supports squaring the stem with the races as well as mating with the contour of the spherical surfaces of the ball bearings in frictionless rolling contact therewith.

A lead for the races is provided that is sufficient to permit self returning of the valve under mild force conditions considering the spiral lead and diameter and shape of the grooves, the helix angle being as low as possible to accentuate the rotational factor within the axial distance of the valve excursion. Preferably the triple start raceways have a 36° to 40° helix angle and a lead of .666 inch and pitch of .222 inch race-to-race with the races having a radius of .067 inch. The three fluted helix has the advantage of being inexpensive to produce by rolling and has excellent accuracy. Another advantage is the greater number of ball bearings usable distributes the forces over many points of contact and enables a small stem diameter of considerable strength along with the ability of conducting the valve to its closed position with a wedging action under low spring forces.

Although the ball bearing bushing 56 may have ball bearing raceways in them matching the stem races 66 for a full rolling contact of the ball bearings, such has not been found to be necessary since there is sufficient rolling contact permitted by the cage openings to provide initial substantially frictionless movement between the stem and a cylindrical bushing 56 over a limited length wherever positioned such as at the initial opening position of the valve and at its open working position that is assumed by the valve when opened by compressed fluid flow.

In these positions there is sufficient freedom of movement permitted by the cage for the relative movement of the parts to be frictionless and the ball bearings serve as guides with or without need for free rolling when transporting the stem between the two positions as when the valve is being opened or closed, the weight of the valve member 68 assisting the spring during closing.

For this purpose the upper end of the stem 64 carries the valve member 80, sometimes referred to as a seat retainer, with the upper end of the stem received in a recess 70 in the valve member 80 for coaxial alignment. Above the recess 70 the valve body receives a disc 72 made of plastic material which axially engages the rounded lower end 32 of the guide stem head 26. Above the disc the head is surrounded by a guide wall 74 in the valve member 80 for contacting the radial margins of the head as at 76 in centering and relative rotational relationship.

The stem 64 preferably is welded to the valve member 80 and likewise the cap 57 is welded to the hub 48 of the spider 47 so that it serves as a lubricant well for the ball bearing assembly.

A comparatively light coiled compression spring 78 is provided between seats 21 and 27 already described and operates through the contact between the head 30 and disc 72 to urge the valve downwardly to its closed position while the ball bearings rotate the valve, stem and races 66 at a helical angle which does not frictionally wedge the parts nor the insert ring 86 and the circular land 48.

The valve member 80 is a flywheel mass peripherally defining an external surface of revolution that curves along the line of flow of the compressed fluid as it flows from the openings 52 to the openings 28 to provide minimum turbulence. Within the projection of the openings 52 the axial face of the valve member 80 is concavely curved outwardly and diverges appreciably as indicated at 82 where it is axially grooved as at 84 to receive a seat insert ring 86 made of plastic material that engages the valve seat land 48 in its closed position. The seat insert 86 adjusts to the lapped surface on the land 48 with a full sealing contact which requires only a light spring to establish. A bleed hole 88 connecting the groove 84 to the downstream side of the valve prevents any pressure build up that might unseat the insert ring.

On its downstream side the surface of revolution arches convexly as at 90 and tapers upwardly as at 92 towards and within the projection of the outlet openings 28 to minimize eddy currents. It is to be observed that this surface of revolution defines a valve member of concentrated mass with a comparatively wide radius of gyration to provide optimal rotational inertia for its locational environment in its open position as well as a substantial lineal inertia for a frequency responsiveness that is much less than the pulse frequency of the compressor.

The check valve herein differs in two respects from considered mechanical vibration analyses. Its excursion is limited by stops and the forcing function, although periodic, is not sinusoidal. However, even though the forcing function is complex and the motion of the helical valve element is compound, it appears from the calculation of the natural frequency for a simple lineal model and a simple rotational model that a responsive frequency of the described construction is at least as low as 1.55 cps. which is well below pulsations of even a single cylinder compressor operating at conventional induction motor speeds.

$fn$ (natural frequency) for linear motion $$fn = 3.13 \ \sqrt{k/w} \text{ in cps}$$

where
$k =$ spring constant (lbs./in.)
$w =$ weight (lbs.)
For this particular valve
$w = .406$ lbs.
& $k = 5.9$ lbs./in.
then $$fn = 3.13 \ \sqrt{5.93/.406} = 12 \text{ cps.}$$

fn for rotational motion $$fn = 3.13 \ \sqrt{L/WR^2}$$

where
$L =$ inch lbs./radian
$W =$ weight (lbs.)
$R =$ radius of gyration in inches
For this particular valve $L = 1/\pi$
$W = .406$ lbs.
$R = 9/16$ inches
then $$fn = 3.13 \ \sqrt{1/\pi(.406) \ (.56)^2} = 1.55 \text{ cps}$$

From these calculations the effect of rotational motion greatly lowers the natural frequency of the same valve member.

Thus, with friction quite low at its open position the resonant frequency of the valve element is substantially less than the expected pulsating frequency of the fluid system and with a light spring the valve can open quite wide to provide a minimal pressure drop which in turn reduces the pulsating forcing function, and with two harmonics of lineal and rotational inertias, that are different, there is a factor of mutual dampening that further reduces the responsive frequency and also wear, particularly where eddy currents are also minimized.

Plastic material as used in this description refers to elastomeric materials characterized by their lubricity or low coefficient of friction, toughness, and resistance to aging, particularly in the presence of heat. Examples of such plastic materials are the thermoplastics acylonitate-butadienestyrene, acetal (homopolymers and copolymers), the fluoroplastics TFE (tetrafluorethylene) a CTFE, and FEP and $PVF_2$ and the like. These materials are preferably used with a suitable inert filler such as alumina, carbon or silica.

What is claimed is:

1. A reciprocable valve for conduits conducting a pulsating fluid under pressure the combination of,
    a housing member including a planar downstream valve seat defining a port,
    a valve member opening and closing said port,
    means for directing opening and closing movements of said valve member with respect to said port having rolling contact with a curvilinear path having lineal and rotational components throughout its length and a helix angle greater than 30° within an approximate range of 15° above said 30°,
    said valve member having a natural frequency with a reversing rotational motion along said path of less than one-half the natural frequency of its lineal movement frequency without the rotational motion, and
    resilient means urging said valve member along said path to its closed position in a direction opposite to the flow of said fluid through the valve.

2. A reciprocable valve for conduits conducting a pulsating fluid under pressure the combination of,
    a housing member including a downstream valve seat defining a port,
    a valve member opening and closing said port,
    means for directing opening and closing movements of said valve member with respect to said port along a curvilinear path having lineal and rotational components throughout its length and a helix angle greater than 30° within an approximate range of 15° above said 30°,
    said valve member having a natural frequency with a reversing rotational motion along said path of less than one-half the natural frequency of its lineal movement frequency without the rotational motion,
    resilient means urging said valve member along said path to its closed position in a direction opposite to the flow of said fluid through the valve,
    said means for directing the valve movement including a ball bearing raceway defining said curvilineal path carried by one of the members, and
    a ball bearing cooperating therewith carried by the other member.

3. The combination called for in claim 2 in which said means for directing said valve movement further includes a valve stem carried by one of said members and having a plurality of said ball bearing raceways concentrically thereon each defining said curvilineal path, and said ball bearing means moves in said raceways supported by a bearing bushing and bearing cage carried by the other member.

4. The combination called for in claim 1 in which said resilient means includes a guide pin reciprocably mounted axially on one of the members and end engaging the other member, and
    a spring between one of said members and said guide pin urging closure of said valve member.

5. In a check valve the combination of,
    a housing member including a valve seat, a valve member compositely movable in opposite directions rotationally and lineally in said housing for opening and closing the valve seat,
    means for supporting said valve member for said movement including,
    a. a stem supported by one of the members and having concentric curvilinear grooves that are substantially helical throughout their length, and b. ball bearing follower means carried by the other member mating with said curvilinear grooves for relative rotational movement between said members in opposite directions of rotation when moved lineally with respect to each other in opposite directions in said grooves, and
    resilient means between said members urging said valve member to close upon said valve seat.

6. The combination called for in claim 5 in which the grooves comprise a plurality of ball bearing raceways each defining said curvilinear grooves, and said follower means includes,
    ball bearing means moving in said raceways supported by a bearing bushing and bearing cage carried by the other member.

7. A valve having a low natural frequency response to periodic pulsations comprising,
    a housing member defining a valve compartment the upper and lower walls of which each define flow passages therethrough spaced from a hub portion having a central opening, said central openings being in axial alignment, one of said walls including a valve seat defining a port,
    a valve member in said housing disposed for movement towards and away from said valve seat on said one of the walls and having on opposite sides central openings coaxial with said other central openings whereby the central openings may be paired on the opposite sides of the valve member,
    a guide pin element reciprocably mounted in one of said two paired central openings and having a head portion of the other end pivotally secured in the other of said two openings, compression spring means between said housing and head portion, a stem element reciprocably mounted in one of the two central openings paired on the other side of said valve member and secured in the other one of said last two openings, said stem having a curvilinear raceway extending axially of said stem element, and ball bearing means engaging said curvilinear raceway and being secured in said one of the said last paired central openings.

8. The embodiment defined in claim 7 in which said ball bearing means in its securement is supported by a ball bearing bushing and bearing cage carried by said one of the said last paired central openings.

9. A check valve for conduits conducting fluid having periodic pulsations comprising, a housing member having a valve compartment and including two spaced walls each of which define flow passages therethrough spaced from a hub portion having a central opening, said central openings being in axial alignment and one of said walls having a valve seat encompassing its flow passages downstream of said one wall, a valve member disposed on the valve seat side of said one wall for movement towards and away from said valve seat and having an opening in its valve seat side paired with one of said coaxial central openings, a valve guide pin element reciprocably received in one opening of said paired openings and secured in the other opening of said paired openings, a stem element secured to said valve member coaxial with said pin element and reciprocably extending into said other central opening, said stem having a raceway spiral throughout its operative length extending axially of the stem, and ball bearing means engaging said ball raceway and being secured in said other central opening for rotating the valve member when it is moved lineally, said lineal movement and rotative movement compounding the inertia moments of said valve member in which the rotational natural frequency is a fraction of its lineal natural frequency to dampen the valve member against the periodic pulsations in fluid passing through said flow passages.

10. In a valve having a housing member, a valve seat disposed around a port in the housing member, and a valve member movable to open and close said port under differential pressures exerted on opposite sides thereof including periodic pulsations on the port side of said valve member, means for supporting said valve member for lineal and rotary movement of the valve member towards and away from the valve port including, a stem supported by one of the members and having a raceway spirally curvilinear throughout its effective length thereon, rolling bearing means supported on the other of said members and including a rounded element engaging in said raceway throughout said effective length to rotate the valve member during its lineal movement to compound lineal and rotary inertias in the same direction for each of said valve movements in opposite directions for a natural response frequency below the lowest sound frequency of said periodic pulsations to dampen responsiveness of said valve member to said pulsations, and light spring means carried by the housing member urging said valve member to close said valve port.

11. The combination called for in claim 10 in which the said valve member has a rotational natural frequency that is a fraction of its lineal natural frequency controlled by the helical angle of said raceway and ball bearing means.

12. The combination called for in claim 11 in which the inch lbs./radian factor of the valve member rotated is less than the weight thereof measured in lbs. and the radius of gyration in inches is greater than said factor.

13. The combination called for in claim 11 in which the constant of said spring means in lbs./in. is approximately fourteen times the weight of the valve member in lbs.

14. The valve construction defined in claim 11 in which said valve member externally defines a surface of revolution which is curved concavely and diverges upwardly and outwardly within the projection of said port to a planar seal insert of plastic material which engages said seat and curves convexly and converges on its downstream side to provide weight volume for the valve member while minimizing flow turbulence.

15. A back flow check valve for fluids subjected to periodic pulsations comprising, a housing member having a wall defining a flow passage therethrough within a downstream valve seat and having an opening coaxial with said seat in a wall spaced from said valve seat, a valve member including a valve insert of plastic material for closing said seat on its downstream side, means carried by said housing concentric with said opening supporting said valve member for lineal and rotary movement on its excursion towards and away from said valve seat and including, stem means carried by one of the members holding said valve member concentric with said valve seat and having a spiral element thereon, rolling follower means carried by the other member and having an element engaging in said spiral element for successively rotating the valve member in opposite directions as the stem and follower means move lineally in opposite directions with respect to each other.

16. The valve defined in claim 15 in which the spiral has a lead of at least twice the diameter of the stem means and the radius of gyration of the valve member is greater than one-half the radius of said flow passage area.

17. The valve defined in claim 1 in which said means comprises a ball bearing race unit and said follower means comprises a ball bearing support unit, one of said units being supported against relative rotation between it and its supporting member.

* * * * *